E. GOLDBERGER.
TRACTOR WHEEL.
APPLICATION FILED JAN. 30, 1920.

1,382,597.

Patented June 21, 1921.

Inventor
Ernest Goldberger

By Whittemore Hulbert & Whittemore
Attorneys

UNITED STATES PATENT OFFICE.

ERNEST GOLDBERGER, OF DETROIT, MICHIGAN.

TRACTOR-WHEEL.

1,382,597. Specification of Letters Patent. Patented June 21, 1921.

Application filed January 30, 1920. Serial No. 355,205.

*To all whom it may concern:*

Be it known that I, ERNEST GOLDBERGER, a citizen of the United States of America, residing at Detroit, in the county of Wayne and State of Michigan, have invented certain new and useful Improvements in Tractor-Wheels, of which the following is a specification, reference being had therein to the accompanying drawings.

The invention relates to tractor wheels of that type in which the wheel is driven from a jack-shaft through the medium of a pinion and internal gear. It is the object of the invention to provide a housing for the gearing which will exclude the dust and retain the lubricant and to this end the invention consists in the means employed for forming the dust and lubricant seal, as hereinafter set forth.

A is a tractor wheel, which is journaled upon an axle B; C is the jack-shaft; D is a pinion thereon. E is an internal gear wheel upon the tractor wheel meshing with said pinion, and F is a non-revoluble side plate for inclosing the space occupied by the internal gear wheel and pinion. Inasmuch as the tractor wheel is running in the soil and is covered with dust and dirt, it would be difficult to form a direct joint between the non-revoluble member F and adjacent revoluble portion of the wheel. Furthermore, where there is a metal contact, the sand and grit entering between the rubbing surfaces would soon cut them out. I have, therefore, provided a packing joint in which there is metallic and non-metallic surfaces in sliding contact with each other and where there is provision for maintaining said surfaces in close contact, so as to effectively exclude the dust and retain the lubricant.

Figure 1:
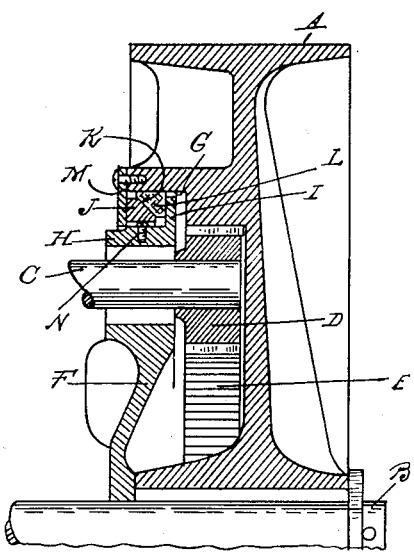
Figure 1 is a vertical central section through a tractor wheel, showing my invention applied thereto.
Figure 2:
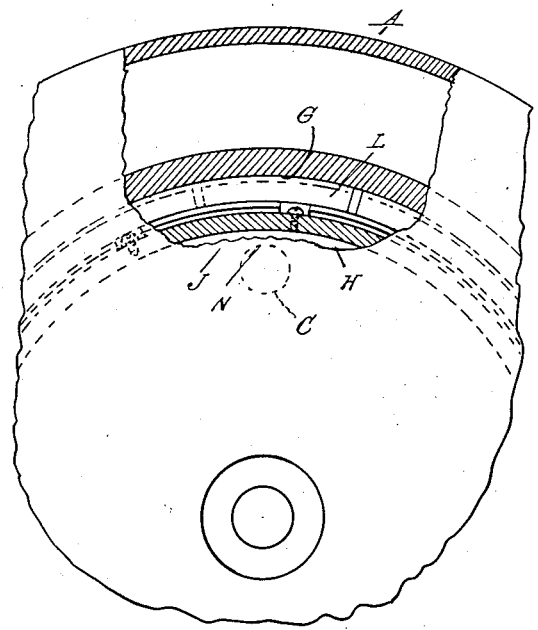
Fig. 2 is a sectional side elevation thereof.

As shown in Fig. 1, the non-revoluble cover member F engages a cylindrical recess G in the tractor wheel and is provided with a flange H, which is concentric with and parallel to the cylindrical wall of said recess. There is further provided upon the non-revoluble member a flange I at right angles to the flange H, or in the plane of rotation, and which extends into proximity to the cylindrical wall G. J is a split metallic ring which is circumferentially contracted to place the same under resilient tension and is inserted within the cylindrical recess G. This ring J has a wedge-shaped cross section with an oblique inner face K, which engages a correspondingly oblique face of a felt or non-metallic packing ring L. The latter ring is inserted within the cylindrical recess in advance of the ring J, so that the outward resilient pressure of said ring J will tend to hold the felt ring in contact with the cylindrical face G of the revolving wheel. The ring J is pressed toward the ring L by an annular flange M, which is bolted or otherwise secured to the revoluble wheel, and bears against the outer face of said ring J.

With the construction just described, when the ring J is forced inward by the tightening of the annular flange M, its wedge-shaped face will be pressed against the wedge-shaped face of the felt ring L, with the result that the ring J will be contracted and the ring L expanded. The ring J is held from rotation by suitable stops, such as the screws N engaging recesses in the opposite ends of said ring and also engaging the flange H of the member F. Thus, when the wheel revolves, the ring J will be held from rotation and as the frictional contact between said ring and ring L coupled with the frictional contact between the ring L and the flange I is greater than the friction of the peripheral face of the ring L, said ring will also be held from rotation. Thus, as the wheel A revolves, the rings J and L will remain stationary, but the ring L will be held at all times in dust-proof and lubricant-tight engagement with the revolving wheel by the resilient pressure of the ring J.

Figure 3:
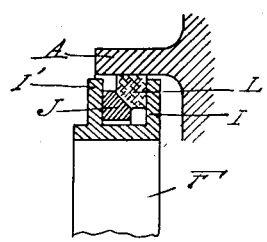
Figs. 3 and 4 are views similar to portions of Fig. 1, showing modified constructions.
Figure 4:
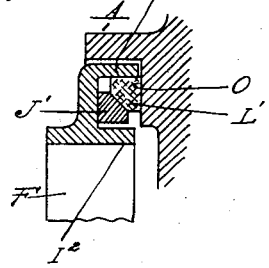

In the modified construction shown in Fig. 3, the rings J and L are placed in a channel in the non-revoluble member F between parallel flanges I and I' thereof, the construction being otherwise the same. In the modification shown in Fig. 4 the rings J' and L' are placed between concentric flanges $I^2$ and $I^3$ on the non-revoluble member F and the ring L' is forced laterally against a sealing face O of the revoluble wheel. With all of these constructions the operation is substantially the same, the resilient tension of the metallic ring serving to maintain the non-metallic ring in close contact with the revolving part.

What I claim as my invention is:

1. The combination with housing members revoluble in relation to each other, of a packing between said members comprising a split resilient ring, and a non-metallic ring having a wedging engagement with each other, and means for maintaining said resilient ring under tension, whereby said non-metallic ring will be maintained in contact with the relatively revoluble part.

2. The combination with a revoluble wheel and drive mechanism therefor, of a non-revoluble member coöperating with said wheel to form a casing for said drive mechanism, and means interposed between said revoluble and non-revoluble members comprising metallic and non-metallic rings of wedge-shaped cross section, said metallic ring being split, means for pressing said metallic ring against the wedge-shaped face of the non-metallic ring so as to place the former under resilient tension and to maintain the latter in contact with the relatively revoluble part.

3. The combination with a wheel and mechanism for revolving the same, of a non-revoluble part coöperating with said wheel to form a housing for said driving mechanism, said revoluble and non-revoluble members having parallel faces spaced from each other and also provided with faces transverse to said parallel faces, which are parallel to each other, and packing means arranged between said parallel faces comprising a split metallic ring under resilient tension, and a non-metallic ring, said rings having wedge-shaped faces engaging each other.

In testimony whereof I affix my signature.

ERNEST GOLDBERGER.